United States Patent [19]
Wacaser

[11] Patent Number: 5,669,450
[45] Date of Patent: Sep. 23, 1997

[54] QUICK MOUNT FRONT END SCARIFIER

[75] Inventor: George A. Wacaser, Morton, Ill.

[73] Assignee: Martin Equipment of Illinois, Inc., Goodfield, Ill.

[21] Appl. No.: 575,226

[22] Filed: Dec. 20, 1995

[51] Int. Cl.$^6$ ............................................... A01B 51/00
[52] U.S. Cl. ................... 172/273; 172/701.3; 172/297; 172/811
[58] Field of Search ........................ 172/272, 273, 172/274, 275, 276, 245, 811, 297, 701.01, 701.03, 721, 733, 765; 37/272, 276, 403; 414/723, 721, 686

[56] References Cited

U.S. PATENT DOCUMENTS

| | | | |
|---|---|---|---|
| 591,432 | 10/1897 | Smith et al. | 37/272 X |
| 1,871,565 | 8/1932 | Soule et al. | 37/272 |
| 1,957,771 | 5/1934 | Gettelman | 37/272 X |
| 1,994,817 | 3/1935 | Gustafson | 37/272 X |
| 2,006,761 | 7/1935 | Frink | 37/272 X |
| 2,269,917 | 1/1942 | Repplinger . | |
| 2,300,801 | 11/1942 | Parker . | |
| 2,431,410 | 11/1947 | Maxim | 37/272 X |
| 2,686,982 | 8/1954 | Leliter . | |
| 2,856,708 | 10/1958 | Schnore . | |
| 3,105,312 | 10/1963 | Price | 37/272 |
| 3,319,366 | 5/1967 | Thompson . | |
| 3,432,949 | 3/1969 | Glesmann | 37/272 X |
| 3,483,641 | 12/1969 | Hirt | 172/273 |
| 3,483,642 | 12/1969 | Glesmann | 37/272 X |
| 3,512,665 | 5/1970 | Westendorf | 172/273 |
| 3,760,883 | 9/1973 | Birk | 172/273 |
| 4,127,951 | 12/1978 | Hatch . | |
| 4,189,854 | 2/1980 | Haynes . | |
| 4,255,884 | 3/1981 | Williams | 37/272 X |
| 4,462,172 | 7/1984 | Caron . | |
| 4,597,202 | 7/1986 | Weeks | 37/272 X |
| 4,625,988 | 12/1986 | Wichey et al. | 37/272 X |
| 4,753,299 | 6/1988 | Meyers | 37/266 X |
| 5,212,897 | 5/1993 | Jefferson | 37/403 |

OTHER PUBLICATIONS

Deere brochure, 770B Motor Grader.
Deere brochure, 670B, 672B, 770B, 770BH, 772BH Motor Graders.
Balderson Inc. brochure—2 pgs.

Primary Examiner—Terry Lee Melius
Assistant Examiner—Victor Batson
Attorney, Agent, or Firm—Emrich & Dithmar

[57] ABSTRACT

An attachment is disclosed for mounting to the front end of a road construction vehicle having a four bar linkage and an hydraulic actuator. A scarifier attachment includes first and second moldboards arranged in a chevron shape, when viewed from above, with the bottom of the V being in the center and forward most position so that the moldboards are inclined outwardly and rearwardly relative to the centerline of the vehicle. At the bottom of each of the moldboards is a scarifier plate which is removably mounted to its associated moldboard. Reinforcing structure is added to the moldboards for strength. In one embodiment, the reinforcing structure forms a receptacle for receiving a conventional scarifier mount, and in a second embodiment, the attachment is mounted to upper and lower horizontal bars forming an integral part of the hydraulically-actuated linkage.

4 Claims, 3 Drawing Sheets

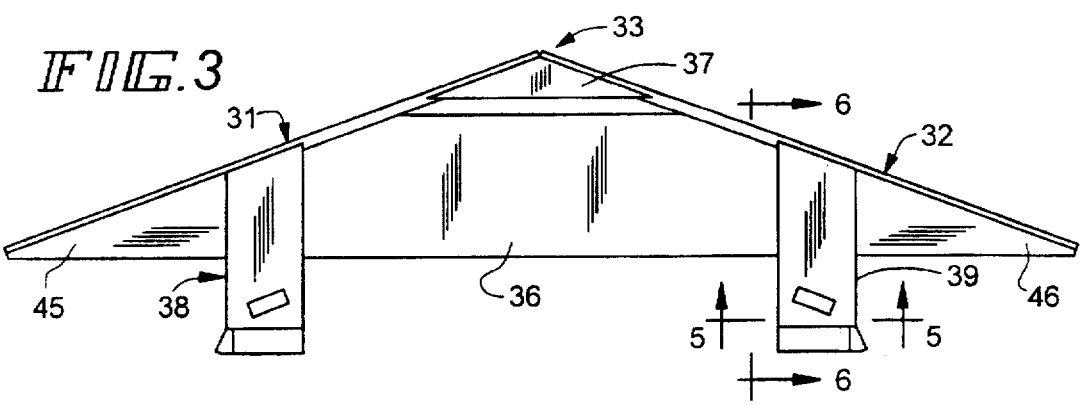
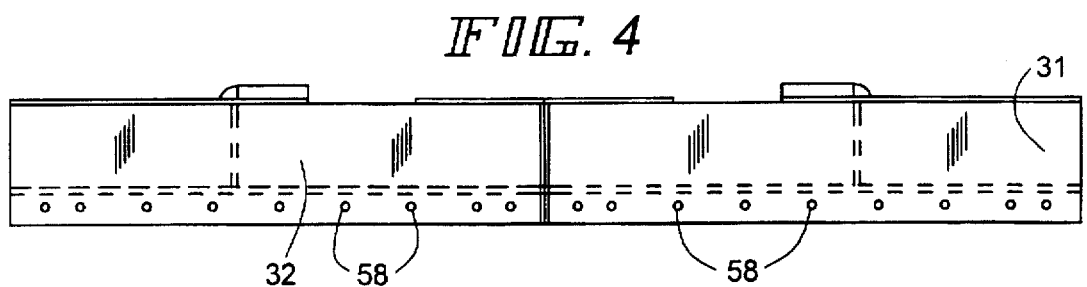
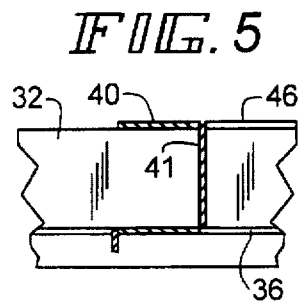
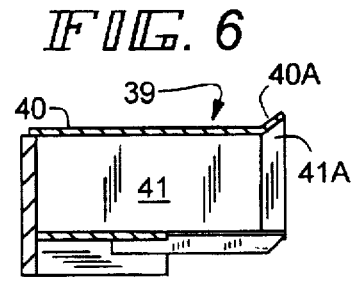
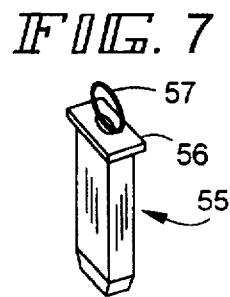
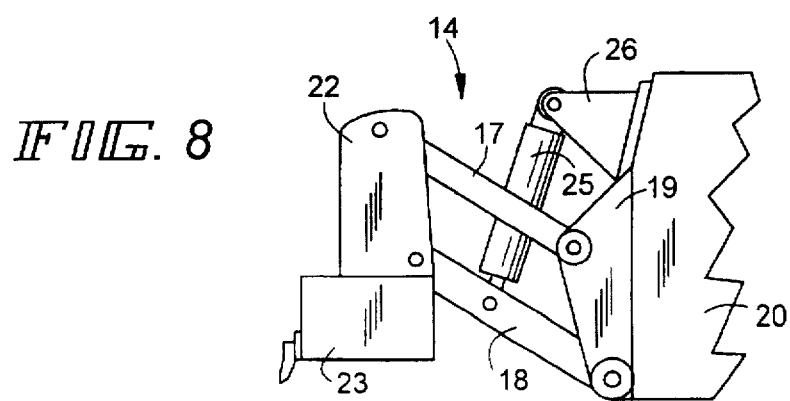

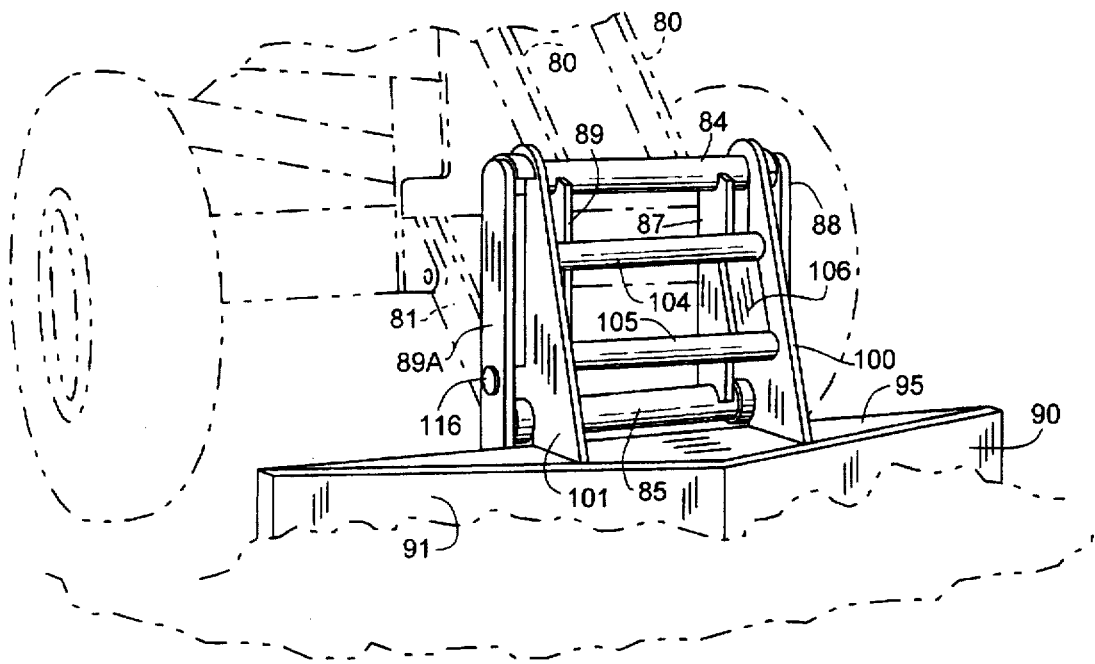
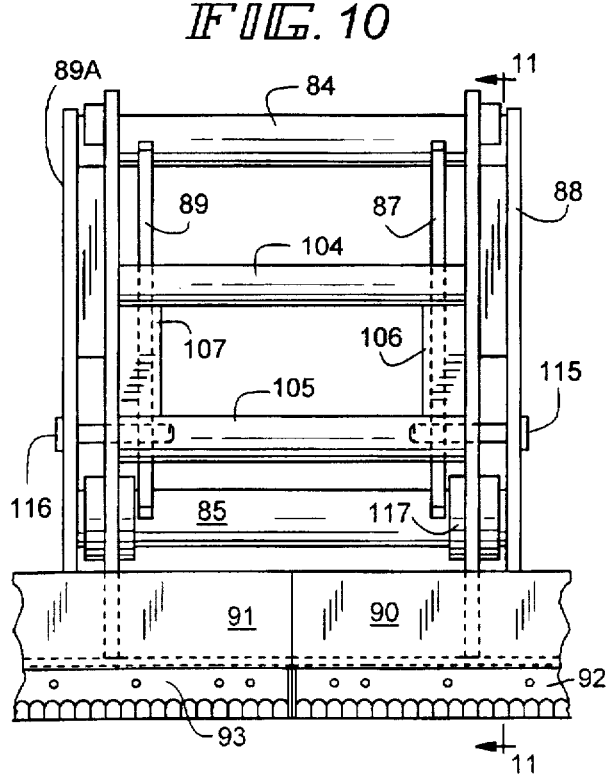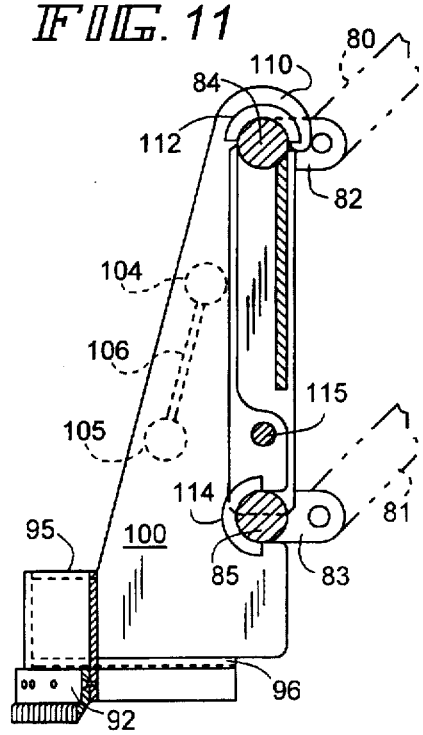

5,669,450

QUICK MOUNT FRONT END SCARIFIER

FIELD OF THE INVENTION

The present invention relates to a road scarifier; and more particularly, it relates to a quick mount attachment for an hydraulically-actuated four bar linkage at the front of a construction vehicle when it is desired to use the vehicle for scarifying a road or the like.

BACKGROUND OF THE INVENTION

Road construction vehicles, such as graders, typically are designed so that various attachments can be mounted to the vehicle, as desired. This permits the vehicle, which is normally quite expensive, to perform more than one function.

It is known, for example, that a conventional motorgrader having a large blade mounted in the center beneath the vehicle frame for road grading purposes, can be converted to a scarifier by removing the blade and installing a straight scarifier blade which extends in a straight line transverse of the vehicle, but slightly inclined, in place of the leveling blade.

Such scarifiers perform well, but they have two disadvantages. The first is that it is time-consuming and somewhat difficult to replace the large grader blade with an equally large and heavy scarifier structure, working beneath the machine frame. It is also sometimes difficult and awkward to store whichever of these structures is not in use.

Secondly, when an existing motorgrader is modified to perform a scarifying function by replacing the existing grader blade, the machine is adapted to perform only one function at a time. That is, it is sometimes desirable to both scarify a road structure (or remove ice from the road) and use a trailing blade to clear the swath being worked on from the materials removed or loosen by the scarifier.

There is also a scarifier structure known in the art which is mounted on an hydraulically-actuated four bar linkage at the front of the vehicle. This structure has a scarifier mount, described in more detail below, which receives individual teeth, rather than a scarifier blade, which is generally more desirable as providing a smoother surface.

SUMMARY OF THE INVENTION

The present invention overcomes the aforementioned problems, first, by providing an attachment with a quick mount scarifier frame which is mounted to the front end of a construction or other vehicle having a hydraulically-actuated, four bar linkage. Two separate quick mount structures are disclosed for adapting the invention to different types of hydraulically-actuated, four bar linkages.

The scarifier frame includes two hardened steel moldboards mounted in the form of a chevron with the point of the chevron shape located on the centerline of the vehicle and at a forward location so that the moldboards extend to the sides and rearwardly of the centerline.

Scarifier blades are mounted to the bottom of the moldboards. Thus, the scarifier blades are themselves in the form of a chevron with the center of the chevron on the center of the machine and with the scarifier blades extending laterally and rearwardly across the width of the machine.

Reinforcing structure is added to maintain the shape and position of the moldboards; and each of the two disclosed embodiments is adapted for quickly mounting to the front of a vehicle having an hydraulically-actuated four bar linkage.

Because of the chevron shape of the scarifier, it is stable when set to rest on a generally horizontal surface, for storage or mounting to a machine. That is, unlike a straight scarifier or grader blade, the scarifier of the present invention can be rested for storage or the like in its normally used position. This permits the operator of a vehicle to drive up to the scarifier blade when it is desired to mount it, and though operation of the four bar linkage, couple the four bar linkage to the scarifier frame. Adaptions are made for securing each attachment to the vehicle. Removing the scarifier frame from the four bar linkage is equally convenient.

Thus, the scarifier frame of the present invention is removably mounted, as an attachment, to a front four bar linkage of the vehicle. This permits the vehicle to perform dual functions simultaneously, when the vehicle is, for example, a motorgrader or the like.

The chevron shape also allows the scarifier to bridge across "washboard" road surfaces, thus, cutting away and removing the "peaks" of a serrated road surface, and leaving a smooth surface. Moreover, when the vehicle is used to remove ice from a road surface, the chevron shape moves material toward the edge of the roadway by "plowing" the material sideways, permitting the main grader moldboard or blade to clean the surface as it trails the scarifier.

Other features and advantages of the present invention will be apparent to persons skilled in the art from the following detailed description of preferred embodiments, accompanied by the attached drawing wherein identical reference numerals will refer to like parts in the various views.

BRIEF DESCRIPTION OF THE DRAWING

FIG. 3 is a top view of the scarifier attachment of FIG. 1, with the front of the scarifier at the top of the drawing;

FIG. 4 is a front elevational view of the scarifier frame of FIG. 1;

FIG. 5 is a cross sectional view taken through the sight line 5—5 of FIG. 3;

FIG. 6 is a vertical cross sectional view taken through the sight line 6—6 of FIG. 3;

FIG. 7 is a perspective view of a locking pin used to secure the scarifier in place after it is mounted to the vehicle;

FIG. 8 is a partial side view of the hydraulically-actuated four bar linkage and scarifier mount of the vehicle of FIG. 1;

FIG. 9 is perspective view, taken from an upper, right and front side of a second embodiment of a quick mount scarifier adapted to a second type of vehicle, with only the forward portion of the vehicle shown in phantom;

FIG. 10 is a front elevational view of the scarifier of FIG. 9, shown in fragmentary form and the mounting structure for the scarifier, and a portion of the forward linkage of the vehicle; and FIG. 11 is a vertical sectional view taken through the sight line 11—11 of FIG. 10.

DETAILED DESCRIPTION OF PREFERRED EMBODIMENTS

Figure 1:
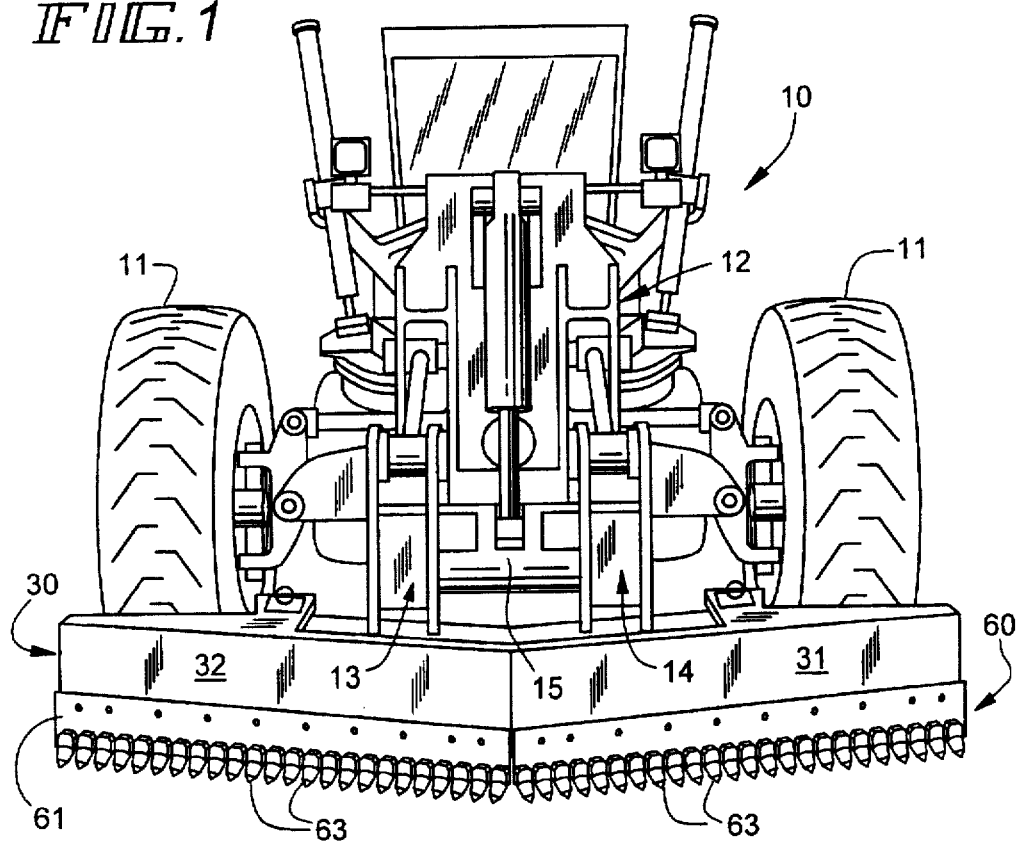
FIG. 1 is a front perspective view of a road construction vehicle with a scarifier attachment constructed according to the present invention mounted to its front four bar linkage.

Referring first to FIG. 1, reference numeral 10 generally designates a conventional motorgrader machine having a pair of front tires 11 and an hydraulically-actuated front four bar linkage generally designated 12. As can be seen in FIG. 1, the four bar linkage 12 includes right and left side four bar linkages, 13, 14, but they are connected together by means of a transverse link 15 so that they operate in unison, as persons skilled in the art are aware.

Turning briefly to FIG. 8, the left side linkage 14 is seen in greater detail as including upper and lower parallel links 17, 18, each having their rear ends pivotally mounted to a bracket 19. The bracket, in turn, is rigidly mounted to the frame 20 of the vehicle. The forward end of the links 17, 18 are pivotally mounted to a tower 22 which is secured to the upper portion of a scarifier mount 23. An hydraulic cylinder 25 has its cylinder end pivotally mounted to a bracket 26 which is mounted to the frame 20. The rod end of the hydraulic cylinder 25 is pivotally mounted to the transverse link 15, as best seen in FIG. 1. When the hydraulic cylinder is retracted (by the operator), the linkage is raised by rotating links 17, 18 clockwise, as viewed in FIG. 8.

Figure 2:
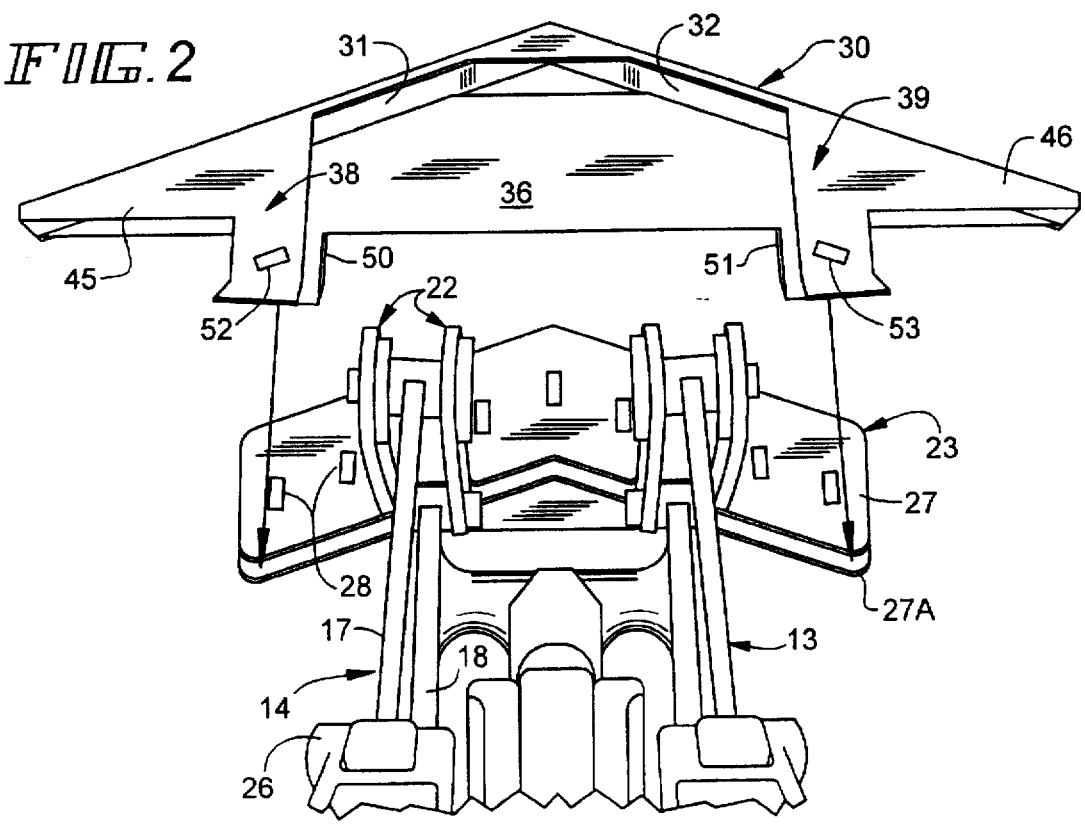
FIG. 2 is an upper rear perspective of the four bar linkage of the vehicle of FIG. 1, taken from above and slightly toward the rear, with the scarifier separated forwardly from the mount on the vehicle.

Turning now to FIG. 2, the scarifier mount 23 is of a type known in the prior art which includes an upper plate 27 and a lower plate 27A, each having a chevron shape as shown in FIG. 2. The plates are mounted to form a single, rigid mount. Each plate has a plurality of rectangular openings or slots such as those designated by reference numeral 28 for the upper plate 27. The lower plate 27A has corresponding rectangular slots in vertical alignment with the slots 28 in the upper plate 27. Each pair of aligned slots receives a scarifier shank, and there are thus nine pairs of slots, and thus nine separate shanks received in the slots, although only seven slots are seen in FIG. 2 because two of the slots are obscured by the towers mounting the four bar linkages to the scarifier mount.

The present invention does not contemplate using the slots 28 nor the individual shanks received therein. Rather, the present invention contemplates a unitary attachment generally designated by reference number 30 which is received on the scarifier mount 23 which, in turn, is mounted to the hydraulically-actuated four bar linkage 12.

As best seen in FIGS. 1 and 4, the scarifier attachment 30 includes a reinforced frame comprising left and right moldboards 31, 32.

The moldboards 31, 32 are similar in structure. The moldboards are welded together in a general chevron shape best seen in FIG. 3 with the point of the V, generally designated 33 in FIG. 3, being located in the center and at the forward most position of the scarifier attachment. The moldboards 31, 32 are also provided with a reinforcing structure in the form of a lower, horizontal plate 36; and the area adjacent to the point 33 is reinforced by means of a triangular plate 37. Thus, the frame of the attachment is a rigid weldment.

Behind the center sections of the moldboards 31, 32 are first and second elongated channels designated respectively 38 and 39. Each of the channels is similar, so only the channel 39 need be described in detail. It includes a top wall 40 and a right side wall 41. The walls 40, 41 are flared outwardly toward the rear, the two flared portions being designated 40A and 41A, respectively. The flared portions serve as guides for receiving the scarifier mount 23 when assembling the attachment to the machine, as diagrammatically illustrated in by the arrows FIG. 2. The two channels 38, 39 cooperate with the reinforcing plate 36 of the frame to provide boots for receiving the side edges of the scarifier mount 23.

Triangular gusset plates 45, 46 are welded to the top of the channels 38, 39 respectively and to the outboard upper edges of the moldboards 31, 32 for further reinforcement of the frame of the attachment.

Thus, the reinforcing plate 36 and the channel members 38, 39 form a receptacle or "sock" for receiving the scarifier mount 23 in the manner illustrated in FIG. 2, with the socks encompassing and holding the outer portions of the scarifier mount.

The channels 38, 39 are provided with lower wall portions 50, 51 as best seen in FIG. 2 so as to complete the retaining portions of the channels, and to lock the attachment in place. That is, each of the upper walls of the channels 38, 39 as well as the extensions 50, 51 are provided with an angular aperture, such as those designated 52 and 53 in FIG. 2. The corresponding apertures of the extensions 50, 51 are located directly beneath their associated rectangular apertures 52, 53. Each pair of associated apertures is adapted to receive a rectangular pin 55 as shown in FIG. 7. Pin 55 has an upper, extended flange 56 to hold it in place and a pull ring 57 for removing the pin. When the scarifier mount 23 is fully assembled into the sock formed in the reinforced attachment 30, pins 55 are placed in the apertures 52, 53 and the pins are long enough to extend through the aligned apertures in the extensions 50, 51 to securely hold the attachment to the scarifier mount.

The lower portions of the moldboards 31, 32 are provided with apertures 58 for receiving bolts which secure the upper portions of left and right scarifier blades 60, 61 (FIG. 1) which are mounted to the lower edges of the mold-boards 31, 32 respectively. The scarifier blades 60, 61 are of a conventional design which, as can be seen from FIG. 1, includes a steel mounting plate and a plurality of immediately adjacent scarifying teeth 63 welded to the lower portions of the associated plate.

Turning now to the embodiment of FIGS. 9–11, the vehicle (shown in phantom) has a different four bar linkage structure including a pair of upper links 80 and a pair of lower links, one of which is seen in FIG. 9 and designated 81. Referring to FIG. 11, the forward ends of the links 80, 81 are pivotally connected to short extension links of 82, 83 respectively. The forward ends of the extension links 82, 83 are welded to a rigid quick mount structure including an upper rigid bar 84 and a lower rigid bar 85. The left end of the horizontal bars 84, 85 are secured together by two reinforcing vertical plates 87, 88 (FIGS. 9 and 10) which are spaced laterally from each other; and the right sides of the horizontal bars 84, 85 are similarly connected by another set of laterally spaced plates 89, 89A.

The scarifier attachment of the embodiment of FIGS. 9–11 is modified to accommodate the existing structure on the four bar linkage of the vehicle shown in FIG. 9 (the hydraulic actuating portion of which is well-known and not shown for brevity).

The attachment of FIG. 9 does include left and right moldboards 90, 91, the lower portions of which are provided with scarifier blades 92, 93 respectively (FIG. 10). Moreover, reinforcing structure including an upper horizontal plate 95 is welded to the upper edges of the moldboards 90, 91 to maintain the moldboards in place during operation. An additional horizontal reinforcing plate 96 is provided at a location behind the moldboards but beneath the upper reinforcing plate 95.

A pair of upright plates 100, 101 which are welded to the horizontal reinforcing plates 95, 96. A pair of horizontal bars 104, 105 are welded between opposing surfaces of the upright plates 100, 101; and the outboard ends of the transverse rods 104, 105 are braced by plates 106, 107. The outboard edges of the plates 106, 107 are also welded to the adjacent surfaces of the upright plates 100, 101 for additional strength.

As best seen in FIG. 11, the upper portions of the upright plates 100, 101 are formed into hooks such as designated at 110 in FIG. 11, and a semi-cylindrical seat 112 is welded to the outboard surface of the plate 100 for engaging the top of the bar 84 of the four bar structure of the vehicle to reduce wear and to distribute the stress caused by loading.

Similarly, a lower portion of the plate 100 is cut out to receive the lower bar 85 of the four bar linkage (see also FIG. 11), and similar curved seats 114, 117 are welded to the outer and inner surfaces of the upright plate 100 for engaging the front surface of the bar 85. The right upright plate 101 is similarly structured.

The plate 100 is apertured to receive a pin 115 which fits through corresponding, aligned apertures in the two laterally spaced plates 88, 87 on the four bar linkage of the vehicle, to hold the quick mount scarifier attachment in place when it is assembled to the four bar linage. A corresponding pin designated 116 in FIG. 10 is provided for the right side of the scarifier attachment to secure it to the spaced vertical bars 89, 89A of the four bar linkage of the vehicle.

The procedure for mounting and removing the scarifier attachments of the two embodiments will be apparent to persons skilled in the art. It will equally well be appreciated by those skilled in the art that the scarifier attachment of the present invention is designed for fitting to the forward four bar linkage of a vehicle which, when hydraulically powered, not only facilitates mounting of the attachment without the need of separate hoists or the like, but also permits the vehicle to be used for a single purpose, such as grading, when it is not desired to use the scarifier, without removing the scarifier.

Finally, if it is desired to remove the scarifier attachment, it is quickly and readily done simply by removing a pair of pins which lock the scarifier attachment to the four bar linkage of the vehicle and, through operating the vehicle in reverse and/or the four bar linkage, withdrawing the vehicle from the attachment. Because of the triangular shape of the moldboards and scarifier blades, the scarifier will stably rest on a horizontal surface for the storage as well as for the mounting and demounting the attachment.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. A quick mount scarifier attachment for use with a vehicle having an hydraulic power mechanism for raising and lowering a four-bar linkage carrying plate means the form of a chevron at the front end of said vehicle, comprising: a frame including first and second vertical moldboards mounted in the form of a chevron when viewed from above with the point of the chevron being located generally on the fore-to-aft center line of said vehicle and being the forwardmost point of said attachment, and reinforcing means for strengthening said moldboards to form a rigid frame said reinforcing means including a lower horizontal reinforcing plate welded to said moldboards for bracing the same, said frame including first and second angle channels extending rearwardly respectively of said first and second moldboards and above said lower reinforcing horizontal plate and cooperating therewith to define a sock for receiving said scarifier mount of said four-bar linkage, said first and second channels each including a horizontal plate having a rearward end, said lower horizontal reinforcing plate of said attachment frame further including first and second extensions located respectively beneath the rearward ends of said horizontal plates of said first and second channels respectively, each of said first and second horizontal plates of said first and second channels and said rearward extensions of said horizontal reinforcing plate defining aligned apertures, cooperating pairs of said apertures receiving a vertical locking pin for locking said attachment to said mount of said four-bar linkage; first and second scarifier plates; means for removably mounting said first and second scarifier plates respectively to said first and second moldboards; quick mount means for removably mounting said scarifier frame to said four-bar linkage of said vehicle; and pin locking means for releasably locking said attachment to said four-bar linkage.

2. The apparatus of claim 1 characterized in that the chevron shape of said moldboards and scarifier plates is sufficient to allow said attachment to rest stably on said scarifier plates when not attached to said four-bar linkage and in a normal use position, thereby to facilitate remounting of said scarifier attachment to said vehicle.

3. The apparatus of claim 1 wherein said four-bar linkage includes a quick mount frame comprising upper and lower horizontal bars and a plurality of vertical plates interconnecting said bars for forming a rigid lift frame, and wherein said attachment includes first and second upright plates extending from said scarifier frame upwardly and rearwardly thereof and laterally spaced and aligned, each of said upright plates defining at its upper end a hook for coupling to the upper bar of said lift frame and extending around the upper portion thereof, each of said upright plates further including a forwardly extending slot for receiving and engaging the forward surface of said lower horizontal bar of said quick-mount frame.

4. The apparatus of claim 3 wherein said pin locking means includes a pin adapted to be fit in aligned apertures in each of said upright plates of said attachment and corresponding apertures in the associated vertical plates of said lift frame, thereby to removably lock said scarifier attachment to said lift frame.

* * * * *